(12) United States Patent
Santiago Bernal

(10) Patent No.: US 9,244,553 B2
(45) Date of Patent: Jan. 26, 2016

(54) TOUCH TELL TALES

(71) Applicant: Continental Automotive Systems, Inc., Auburn Hills, MI (US)

(72) Inventor: Dolores Santiago Bernal, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/106,985

(22) Filed: Dec. 16, 2013

(65) Prior Publication Data

US 2014/0168123 A1     Jun. 19, 2014

Related U.S. Application Data

(60) Provisional application No. 61/738,439, filed on Dec. 18, 2012.

(51) Int. Cl.
G06F 3/041 (2006.01)
G06F 3/0488 (2013.01)
G06F 3/14 (2006.01)
G06F 3/147 (2006.01)
B60K 35/00 (2006.01)

(52) U.S. Cl.
CPC .............. *G06F 3/041* (2013.01); *B60K 35/00* (2013.01); *G06F 3/0488* (2013.01); *G06F 3/147* (2013.01); *G06F 3/1423* (2013.01)

(58) Field of Classification Search
None
See application file for complete search history.

(56) References Cited

U.S. PATENT DOCUMENTS

2009/0189373 A1 * 7/2009 Schramm et al. ............. 280/731

OTHER PUBLICATIONS

Touch-Screen Steering Wheel Keeps Eyes on Road, Discovery News web site. Jun. 6, 2011, http://news.discovery.com/autos/steering-wheel-interface-driving-110606.htm.

* cited by examiner

*Primary Examiner* — Muhammad N Edun

(57) ABSTRACT

A disclosed digital display is mounted within a vehicle steering wheel and displays a selectively touch actuateable tell tales. The digital display is actuateable responsive to touching a specific designated location on the display corresponding to an actuated telltale. A controller is operable for actuating the digital display to change the display to communicate information relating to the actuated telltale.

11 Claims, 2 Drawing Sheets

TOUCH TELL TALES

CROSS REFERENCE TO RELATED APPLICATION

This application claims priority to U.S. Provisional Application No. 61/738,439 filed on Dec. 18, 2012.

TECHNICAL FIELD

The present disclosure relates to vehicle information communication display, and more specifically to tell tales for communicating information to a vehicle operator.

BACKGROUND

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. The instrument panels also include images that illuminate to alert an operator to specific conditions of the vehicle. These images are known as tell tales and are activated to alert a driver of a condition that requires attention such as a check engine light, or a light that indicates that the tires require attention.

The tell tales typically communicate little information, but are intended to simply alert the drive that something requires additional attention. For example, in the case of a check engine light, the operator is simply prompted to have a vehicle service department check the vehicle. The operator is not provided any further information as to the urgency of any corrective action. Typical instrument panels include limited space and therefore are not capable of displaying all the different levels of information that would fully communicate vehicle conditions to an operator. Moreover, much information is only required when a vehicle operating parameter is outside of desired operating ranges.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A disclosed vehicle information display assembly includes a digital display including a plurality of selectively actuateable tell tales and a controller for controlling operation of the digital display. The controller is operable for actuating the digital display to change the display to communicate information relating to an actuated telltale. The digital display is mounted within a vehicle steering wheel and is actuateable responsive to touching a specific designated location on the display corresponding to the actuated telltale.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
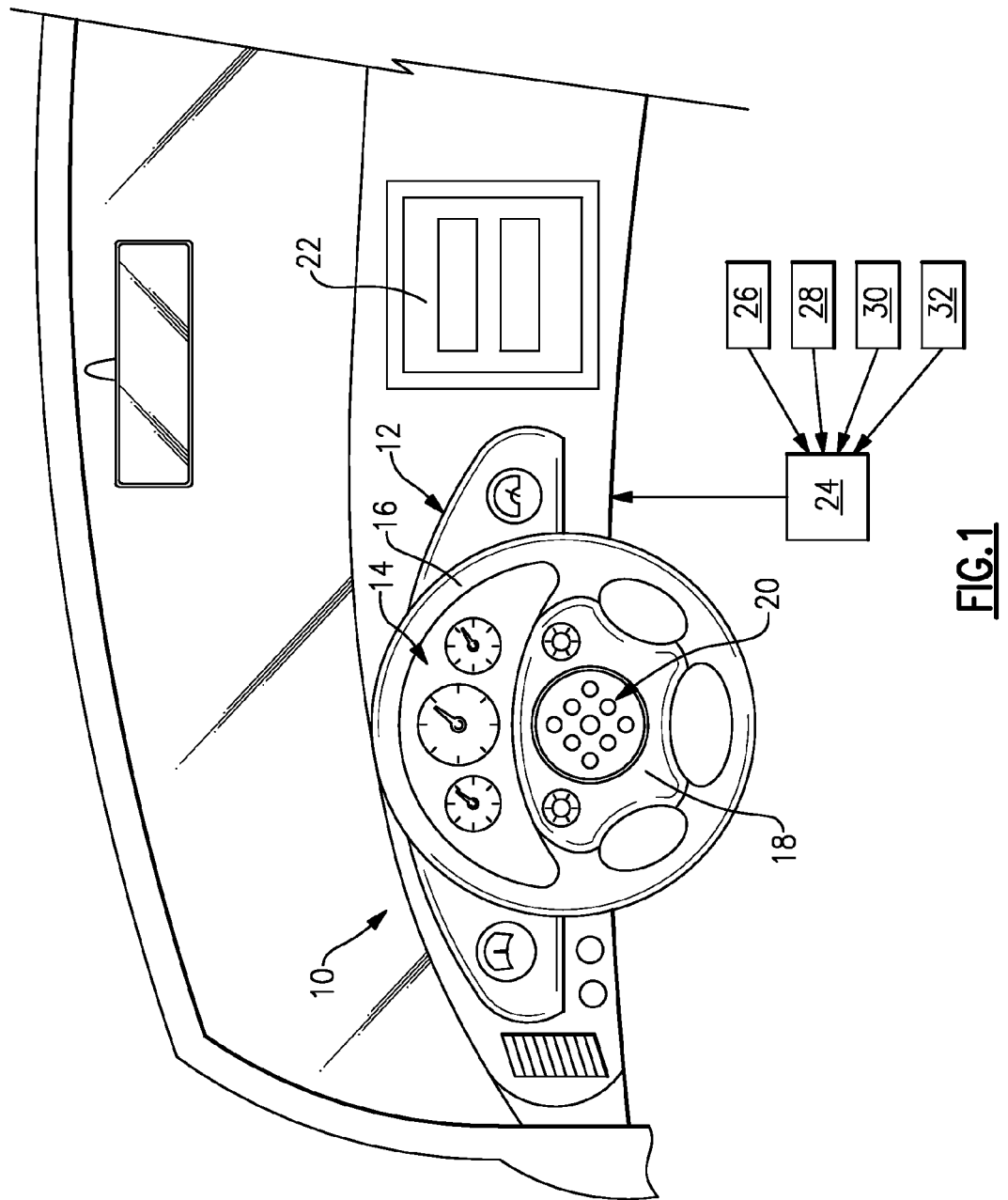
FIG. 1 is a schematic view of an example vehicle steering wheel, dashboard and instrument panel.

Referring to FIG. 1, a vehicle dashboard 10 is shown and includes an instrument panel 12 that includes gauges 14. A steering wheel 16 includes a digital display 18 that is touch sensitive to actuate various telltales 20 corresponding to a location on the display 18. A second display 22 is supported within the dashboard separate from the steering wheel 16. A controller 24 is provided that is operable to control operation of the displays 18, 22. The controller 24 is in communication with various vehicle systems to provide information to at least one of the displays 18, 22 that is indicative of current vehicle operating conditions. The telltales 20 shown on the display 18 include icons and symbols that are recognized and intuitively communicate the particular system or vehicle operating parameter.

Actuation of one of the telltales 20 alerts a vehicle operator of a condition that requires attention. Actuation to alert the vehicle operator can include changing of telltale's color or increasing the illumination brightness. The image of the telltale 20 may be otherwise changed in a manner to alert a vehicle operator in other ways, such as blinking, or completely changing the picture or icon of the telltale 20. Typical telltales operate simply to alert a vehicle operator that a problem or condition exists, but fail to provide further detail that may be of use to a vehicle operator. The example touch telltales 20 are actuateable to provide further detailed information.

The example controller 24 is in communication with various systems such as the tire pressure monitoring system 26, engine 28, entertainment system 30 and communication system 32. The controller 24 uses the information from the various systems 26, 28, 30, and 32 to generate an alert with the corresponding one of the plurality of telltales 20 in response to a predefined condition. The predefined condition can include out of range conditions such as low tire pressure, or engine oil levels. The predefined conditions can also include receipt of an incoming communication such as a phone call. Additionally, the touch telltale can be utilized to provide information on the entertainment system, such as what is playing, what sources are available and what other selections are available.

Actuation of a telltale 20 is performed by an operator touching a specific touch telltale on the digital display 18. The controller 24 will then actuate either the display 18 or the secondary display 22 to show images and data relating to that specific touch telltale 20.

Figure 2:
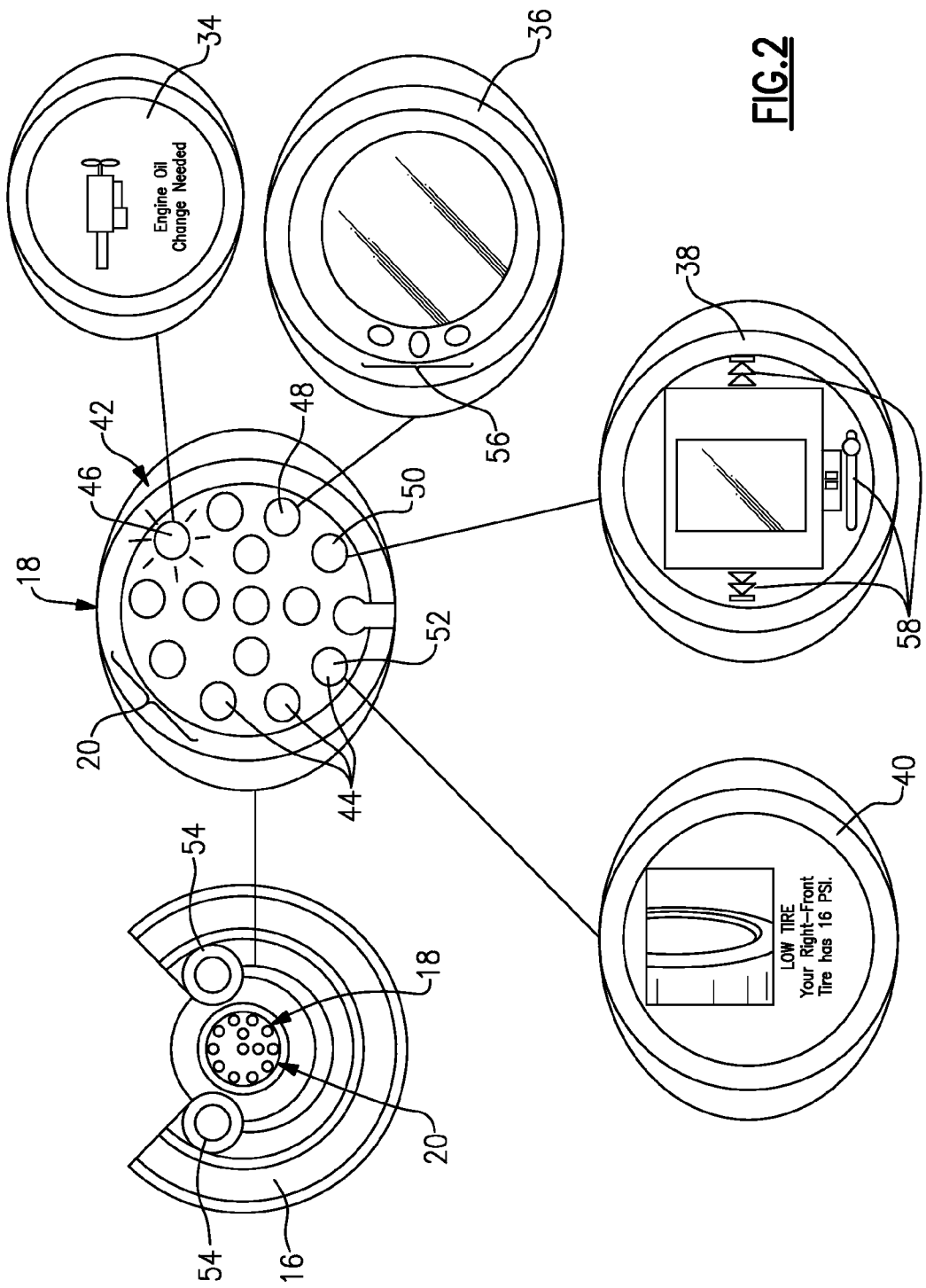
FIG. 2 is a schematic view of different example touch telltale images.

Referring to FIG. 2 with continued reference to FIG. 1, the display 18 includes the plurality of touch telltales 20 that provide information on different vehicle operating systems. The example display 18 is touch activated, but may also be activated by a corresponding controller 54 supported on the steering wheel 16.

Moreover, one of the display 18 and secondary display 22 could be part of an instrument cluster supported within the instrument panel 12. The displays 18, 22 could also be part of a heads-up-display (HUD) that is actuateable by the controller 54 located on the steering wheel, or another control device operable by a vehicle operator. The detailed images generated in response to actuation of a specific telltale 20 may also be projected in a HUD to provide further heads up viewing of the selected detailed information.

The digital display 18 includes a plurality of touch telltales 20 that can be part of a default view, or may be adapted to be part of different views relating to different vehicle systems. In this example, the display 18 is shown with a plurality of touch telltales 20 displayed corresponding to locations 44 on the display 18 that actuate the specific touch telltale. The example plurality of touch telltales 20 includes a first touch telltale 46 for the engine 28, a second touch telltale 48 for the communication system 32, a third touch telltale 50 for the entertainment system 30 and a fourth touch telltale 52 for the tire pressure monitoring system 26. It should be understood that other touch telltales are within the contemplation of this disclosure that provide information on other systems such as navigation systems, braking systems, climate control system and any other vehicle system.

In operation, an out of range condition communicated to the controller 24, for example from the engine 28 will cause the controller 24 to actuate the touch telltale 46 to display an alert image such as is schematically shown at 42. The alert image 42 can include any visual or audio prompt that alerts a vehicle operator and directs attention to that particular touch telltale. In this example, the touch telltale 46 is flashed to draw attention from the vehicle operator.

The vehicle operator may than touch digital screen 18 proximate to the touch telltale 46 to cause the controller 24 to change the image of the digital screen 18 to a more detailed image as is indicated at 34. In this example, the detailed image 34 communicates information specific to the current out of range condition of the engine. The example out or range condition is an indication that vehicle requires an engine oil change. The operator is therefore provided with the specific information required to understand the urgency of the telltale alert. In this instance, the operator will know that immediate action such as shutting down the vehicle is not required, but that the oil should be changed promptly. Accordingly, the operator is provided information required for evaluating the urgency and needed course of action.

Similarly, upon an alert notification regarding the tire pressure monitoring system 26 corresponding with the touch telltale 52, a detailed image 40 is generated and shown to the operator. The image 40 can be displayed on either the first display 18, or the second display 22. The image 40 provides detailed information, in this example, as to which tire has a low tire pressure so that corrective action can easily be implemented by the operator.

The touch telltales 20 can also include prompts to alert of when incoming communication such as a telephone call is detected. The touch telltale 48 can be actuated to prompt the display of information indicative of an incoming call, such as the origin of the call. The image 36 can also provide options such as accept or reject the incoming call. The display 36 can include additional icons 56 that can be actuated to provide the desired function. For example, the image 36 can include an icon that when actuated accepts the call. Other images relating to other vehicle operating conditions can include system appropriate icons that can be actuated to provide the desired operation.

For example, the touch telltale 50 can be actuated to generate the image 38 that includes icons for controlling the audio system 30. The image 38 can include volume controls, as well as play, pause, rewind and other controls as are indicated at 58. Each of the controls 58 can be provided in the display 18 on the steering wheel to provide operation without requiring an operator to release the steering wheel 16. Moreover, the digital display 18 is located in a central location on the steering wheel 16 to maintain operator attention and focus forward during operation.

Accordingly, the example touch telltales 20 generated on the display 18 mounted to the steering wheel 16 provides for the communication of additional information to a vehicle operator of out of range conditions. Moreover, the touch telltales 20 provides a simply configuration for actuating and obtaining data on vehicle systems in one central location.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle information display assembly comprising:
    a first digital display including a plurality of selectively actuateable telltales, the first digital display is mounted within a vehicle steering wheel and is actuateable responsive to touching a specific designated location on the first digital display corresponding to the actuated telltale;
    a second digital display mounted remote from the steering wheel for displaying information responsive to actuation of the telltale on the first digital display on the steering wheel; and
    a controller for controlling operation of the digital display, wherein the controller is operable for actuating the digital display to change the display to communicate information relating to an actuated telltale.

2. The vehicle information display as recited in ciaim 1, wherein the controller is operable to command the digital display to display detailed information relating to the actuated telltale.

3. The vehicle information display as recited in claim 1, wherein the telltale alerts an operator that a vehicle operating parameter is outside a desired operating range and the change in the digital display provides detail information specific to the telltale.

4. The vehicle information display as recited in claim 3, wherein the telltale communicates information indicative of tire pressure and detailed information displayed responsive to actuation of the telltale comprise one of a location and pressure of a tire outside of a desired operating range.

5. The vehicle information display as recited in claim 1, wherein the telltale alerts an operator of an incoming signal from a communication system and actuating the telltale changes the display to show detailed information on the incoming signal.

6. The vehicle information display as recited in claim 1, wherein the telltale communicates information relating to a vehicle audio system and actuating the telltale changes the display to show detailed information relating to the audio system.

7. A method of communicating information relating to a vehicle operating parameter comprising:
    generating a telltale image indicative of at least one vehicle operating parameter on a touch actuateable first digital display supported in a vehicle steering wheel;
    actuating the image by changing the image to alert an operator of a predefined condition;
    changing the first digital display to communicate detailed information relating to the predefined condition that caused the image change to alert the operator; and displaying information on a second display located remote from the steering wheel in response to actuation by the operator of a telltale image generated on the first digital display.

8. The method as recited in claim 7, wherein actuating the image by changing the image to alert an operator comprises changing one of a color and illumination level of the telltale.

9. The method as recited in claim 7, wherein changing the digital display comprises touching an area of the digital display corresponding to the telltale to trigger the display of detailed information relating to the cause of the alert.

10. The method as recited in claim 7, including alerting a vehicle operator responsive to a vehicle operating parameter being outside a desired range and triggering the display to show detailed information regarding the operating parameter outside of the desired range.

11. The method as recited in claim 7, including alerting a vehicle operator responsive to incoming signal from a communication system and actuating the telltale changes the display to show detailed information on the incoming signal.

* * * * *